(12) United States Patent
Gebhardt et al.

(10) Patent No.: US 8,834,649 B2
(45) Date of Patent: *Sep. 16, 2014

(54) SYSTEM FOR REDUCING DEPOSITS ON A COMPRESSOR

(75) Inventors: Eric Gebhardt, Roswell, GA (US); Rahul J. Chillar, Marietta, GA (US); Dale J. Davis, Marietta, GA (US)

(73) Assignee: General Electric Company, Schenectady, NY (US)

(*) Notice: Subject to any disclaimer, the term of this patent is extended or adjusted under 35 U.S.C. 154(b) by 360 days.

This patent is subject to a terminal disclaimer.

(21) Appl. No.: 13/180,044

(22) Filed: Jul. 11, 2011

(65) Prior Publication Data

US 2011/0259375 A1 Oct. 27, 2011

Related U.S. Application Data

(62) Division of application No. 12/189,900, filed on Aug. 12, 2008.

(51) Int. Cl.
*B08B 3/00* (2006.01)
*B08B 3/02* (2006.01)
*F01D 25/00* (2006.01)
*F02C 3/30* (2006.01)
*F02C 7/00* (2006.01)
*F04D 29/70* (2006.01)

(52) U.S. Cl.
CPC ............ *F02C 3/30* (2013.01); *F04D 29/705* (2013.01); *F05D 2260/95* (2013.01); *F01D 25/007* (2013.01); *F05D 2270/08* (2013.01); *F01D 25/002* (2013.01); *F05D 2260/212* (2013.01)
USPC ....... 134/115 R; 134/117; 134/137; 134/138; 134/139; 134/140; 134/141; 134/143; 134/144; 134/146; 134/147; 134/148; 134/151

(58) Field of Classification Search
None
See application file for complete search history.

(56) References Cited

U.S. PATENT DOCUMENTS

| 2,595,490 | A | * | 5/1952 | Schubring et al. | 122/459 |
|---|---|---|---|---|---|
| 2,919,070 | A | * | 12/1959 | Arant | 239/10 |
| 6,073,637 | A | * | 6/2000 | Hayward et al. | 134/22.1 |
| 6,491,048 | B1 | * | 12/2002 | Foster | 134/169 A |
| 2002/0129837 | A1 | * | 9/2002 | Ruiz et al. | 134/18 |
| 2007/0000528 | A1 | * | 1/2007 | Asplund et al. | 134/166 R |
| 2007/0028947 | A1 | * | 2/2007 | Erickson et al. | 134/22.18 |
| 2008/0078422 | A1 | * | 4/2008 | Wagner | 134/22.1 |
| 2010/0011886 | A1 | | 1/2010 | Czapiewski et al. | |

FOREIGN PATENT DOCUMENTS

| EP | 1375866 A2 | * | 1/2004 | F02C 7/08 |
|---|---|---|---|---|
| JP | 07279613 A | * | 10/1995 | F01D 25/00 |

OTHER PUBLICATIONS

Amamiya, "JP07279613A English Machine Translation.pdf", Oct. 27, 1995—Machine translation from PAJ.*

* cited by examiner

*Primary Examiner* — Joseph L Perrin
*Assistant Examiner* — Levon J Shahinian
(74) *Attorney, Agent, or Firm* — Ernest G. Cusick; Frank A. Landgraff

(57) ABSTRACT

An embodiment of the present invention provides a water wash system that may mix a cleaning fluid with at least one chemical agent to form a cleaning solution. The cleaning solution may reduce the corrosives on components of a compressor. The cleaning solution may be a mildly acidic solution to reduce corrosion of a caustic nature. Alternatively, the cleaning solution may be a mildly basic solution to reduce corrosion of an acidic nature.

8 Claims, 2 Drawing Sheets

SYSTEM FOR REDUCING DEPOSITS ON A COMPRESSOR

This is a divisional application claiming priority to commonly-assigned U.S. patent application Ser. No. 12/189,900, entitled "System for Reducing Deposits On A Compressor", filed Aug. 12, 2008; which is incorporated herein by reference in its entirety.

BACKGROUND OF THE INVENTION

The present invention relates generally to a turbomachine; and more particularly to a water wash system for cleaning the compressor of a turbomachine.

Some turbomachines, such as, but not limiting of, gas turbines, and aero-derivatives, have an air inlet system that channels the incoming airstream towards a compressor. The inlet system usually has a filter section, which screens the airstream of foreign objects and other undesired materials. Typically, the inlet system and the compressor are created out of metals that may corrode due to the environment (ambient conditions, etc) in which the turbomachine operates. These turbomachines may develop microenvironments related to the ambient conditions in which the turbomachine operates. These microenvironments, which have accelerated airflows and pressures, typically increase the corrosion rate of the components of the compressor.

Water wash systems are commonly used to remove the contaminants and reduce the corrosives on the compressor of the turbomachines. Some water wash systems operate while the turbomachine operates. These are commonly referred to as "on-line" water wash systems.

On-line water wash systems typically use de-mineralized water (hereinafter "de-min water") to clean the compressor. However, a cleaner stronger than de-min water is required to reduce or eliminate some corrosives.

For the foregoing reasons, there is a need for a water wash system that can use more than de-min water to clean the compressor. The system should use a cleaning solution that yields a stronger cleaning result on than that of de-min water.

BRIEF DESCRIPTION OF THE INVENTION

In an embodiment of the present invention, a water wash system for a turbomachine comprising an inlet plenum and a compressor, the water wash system comprising: a plurality of nozzles positioned within the inlet plenum; a first tank for storing a cleaning fluid used by the water wash system; and a second tank for storing at least one chemical agent used by the water wash system; wherein the water wash system mixes the at least one chemical agent with the cleaning fluid to create at least one cleaning solution which is moved through the plurality of nozzles towards the compressor; and wherein the cleaning solution can reduce a level of corrosives on the compressor.

In an alternate embodiment of the present invention, a system for reducing the corrosives on a compressor of a turbomachine, the system comprising: an inlet system for directing air into the compressor of the turbomachine, the inlet system comprising: an inlet filter house for screening an airstream entering the inlet system; a cooling module for conditioning the airstream within the inlet system; a silencer section for reducing noise within the inlet system; an inlet bleed heat system for conditioning the airstream; and an inlet plenum; and a water wash system comprising: a plurality of nozzles positioned within the inlet plenum; a first tank for storing at least one cleaning fluid used by the water wash system; and a second tank for storing at least one chemical agent used by the water wash system; wherein the water wash system mixes the at least one chemical agent with the cleaning fluid to create a cleaning solution, and pumps the cleaning solution through the plurality of nozzles towards the compressor; and wherein the cleaning solution can reduce corrosives on the compressor.

BRIEF DESCRIPTION OF THE DRAWINGS

These and other features, aspects, and advantages of the present invention will become better understood when the following detailed description is read with reference to the accompanying drawings in which like characters represent like elements throughout the drawings.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An embodiment of the present invention provides a water wash system that may mix a cleaning fluid with at least one chemical agent to form a cleaning solution. The cleaning solution reduces the corrosives on components of a turbomachine compressor. The cleaning solution may be an acidic solution to reduce corrosion of a caustic nature. Alternatively, the cleaning solution may be a basic solution to reduce corrosion of an acidic nature. As described below, an embodiment of the present invention may allow for the at least one chemical agent and the cleaning fluid to mix within a first tank prior to flowing through a plurality of nozzles. Also, an alternate embodiment of the present invention allows for the at least one chemical agent and the cleaning fluid to mix in a header located downstream of the first tank.

Figure 1:
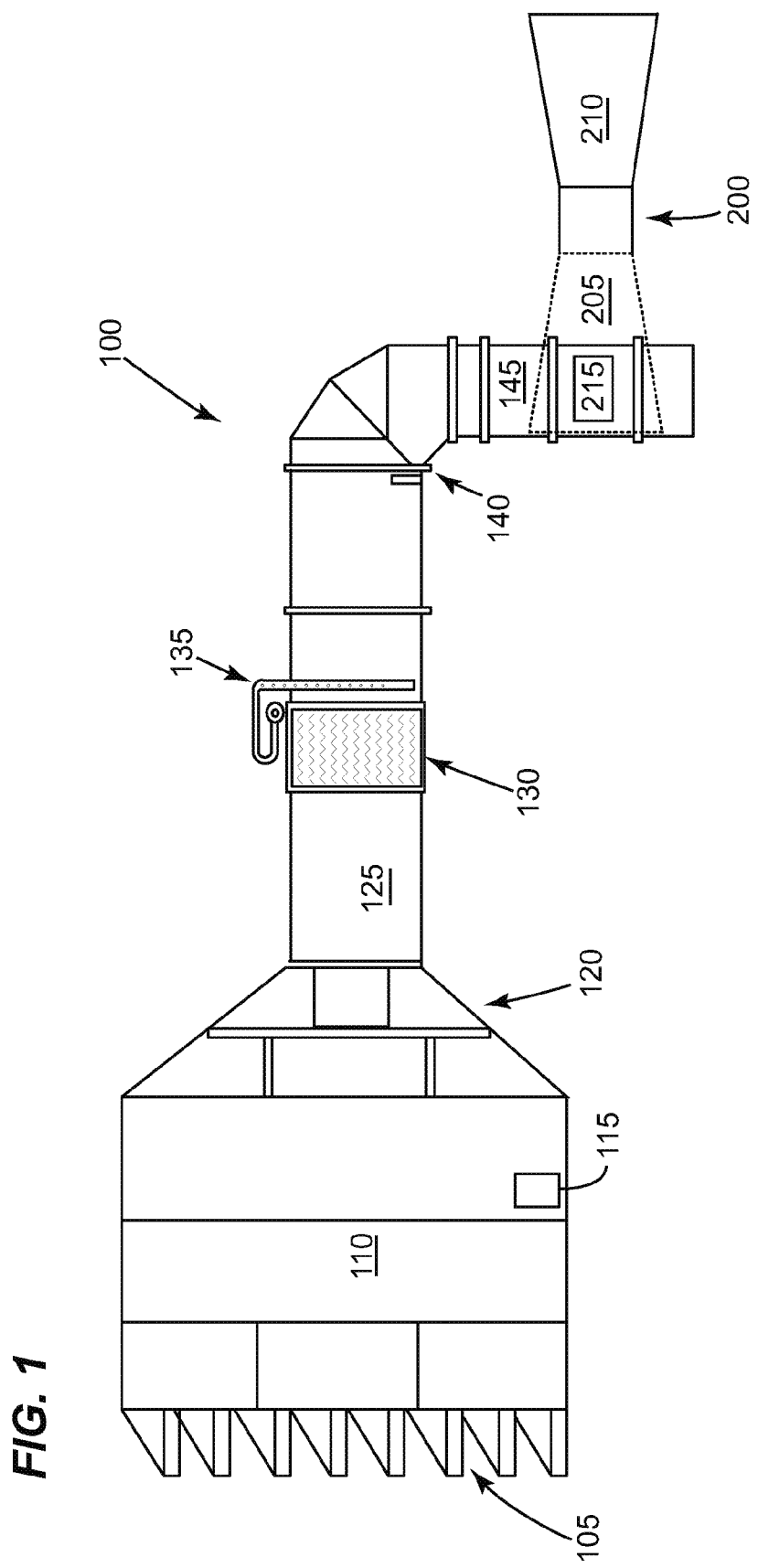
FIG. 1 is a schematic illustrating an environment where an embodiment of the present invention may operate.

Referring now to the Figures, where the various numbers represent like elements throughout the several views, FIG. 1 is a schematic illustrating an environment where an embodiment of the present invention may operate. FIG. 1 illustrates an inlet system 100 that may be integrated with a compressor 205 of a turbomachine 200. During operation of the turbomachine 200, the compressor 205 may become fouled by corrosives elements within the airstream. Also, an operator of the turbomachines 200 may use a water wash system 215 to clean and reduce the level of corrosion on the compressor 205.

The following description provides an overview of a typical configuration of an inlet system 100. However, the present invention may be used with other configurations of the inlet system 100, which are not illustrated in the Figures. The inlet system 100 channels the airstream drawn in by the compressor 205. The airstream usually comes from the environment in which the turbomachine 200 operates. Initially, the airstream flows around a weather hood 105, which may prevent weather elements, such as rain, snow, etc, from entering the compressor 205. The airstream may then flow through an inlet filter house 110; which generally removes foreign objects and debris from the airstream. Next, the airstream may flow through a cooling module 115. Next, the airstream may flow through a transition piece 120 and an inlet duct 125; these components may adjust the velocity and pressure of the airstream. Next, the airstream may flow through a silencer section 130. Next, the airstream may flow through an inlet bleed heat system 135, which generally increases the airstream temperature prior to entering the compressor 205. A screen 140, or the like, may be located downstream of the inlet duct 125 and generally serves to prevent debris from entering the compressor 205. The inlet plenum 145 may connect the inlet system 100 with the compressor 205.

In an embodiment of the present invention, the water wash system 215 includes a plurality of nozzles 225 located in and/or adjacent the inlet plenum 145. An embodiment of the present invention may provide a water wash system 215 that operates while the turbomachine 200 is in normal operation. This may be considered an on-line water wash system 215.

Figure 2:
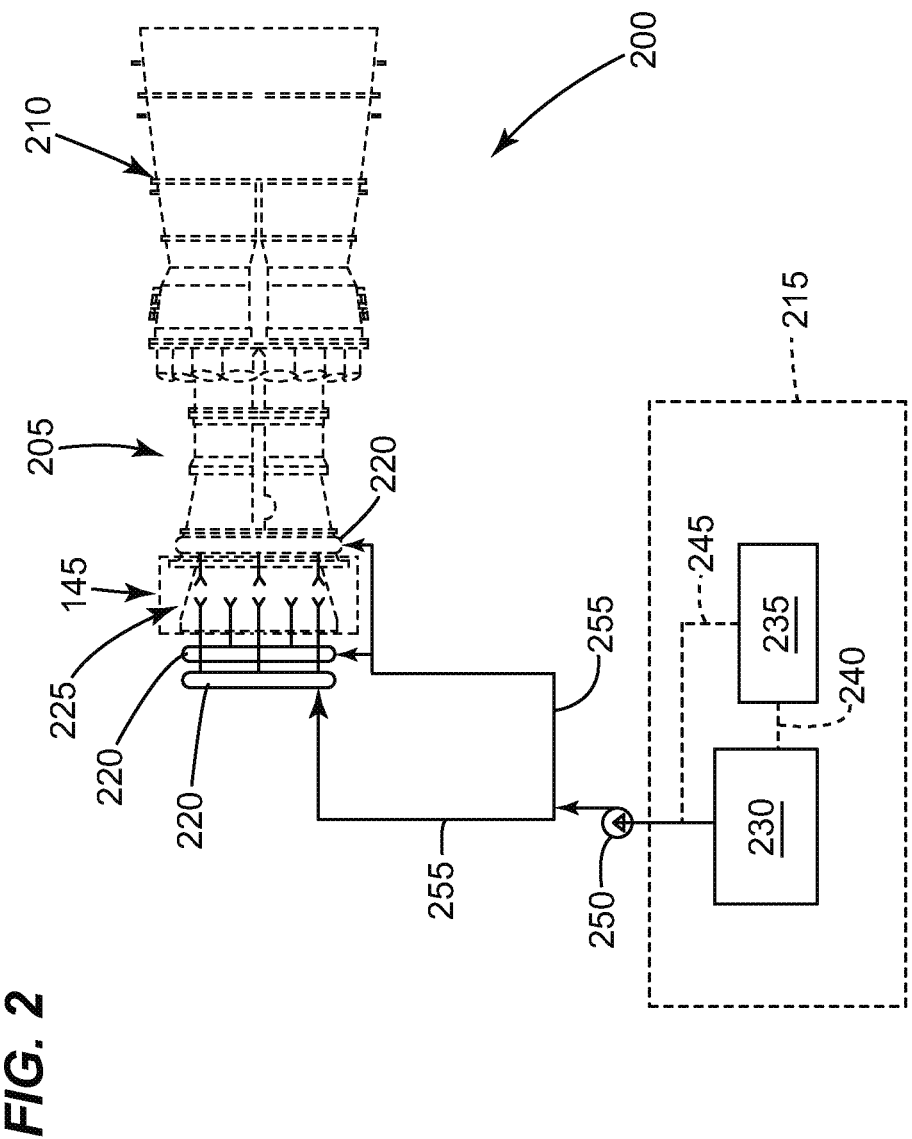
FIG. 2 is a schematic illustrating embodiments of a water wash system, in accordance with embodiments of the present invention.

FIG. 2 is a schematic illustrating an embodiment of a water wash system 215, in accordance with an embodiment of the present invention. As discussed the water wash system 215 may be integrated with the turbomachine 200. In an embodiment of the present invention, the turbomachine 200 comprises a compressor 205 and a turbine section 210. Other components of the turbomachine 200 are shown for illustrative purposes only. The components of the water wash system 215 may be comprised of a stainless steel, or any other material capable of withstanding the operating environment to which the water wash system 215 may be subjected.

Generally, on-line water washing may be considered the process of injecting a cleaning fluid such as, but not limiting of, de-min water into the inlet of the compressor 205, while the turbomachine 200 operates near a synchronous speed. On-line water washing provides the user with the advantage of cleaning the compressor 205 without shutting down the turbomachine 200. The aforementioned water wash system 215 components along with various other piping, fittings, valves (none of which are illustrated), may be mounted on or near the turbine machine 200.

The embodiments of the present invention may use at least one chemical agent to neutralize the corrosives on the compressor 205. The chemical agent, or agents, may be of a mild strength, making the cleaning solution either mildly acidic or mildly basic. This cleaning solution may neutralize the corrosives and possibly remove some of the corrosive deposits on the compressor 205.

A first embodiment of the water wash system 215 may comprise at least one manifold 220 with nozzles 225 attached. A first tank 230 for housing a cleaning fluid, such as, but not limiting of, de-min water; a second tank 235 for storing a chemical agent, such as, but not limiting of, an acidic agent or a basic agent. A direct line 240 allows the contents of the second tank 235 to enter the first tank 230. At least one pump 250 for moving the contents of the first tank 230 and the second tank 235 through the nozzles 225.

The environment that the turbomachine 200 operates may allow for corrosive elements, ingested by the inlet system 100, to deposit of the blades of the compressor 205. These deposits may be either sold or liquid in nature. As the humidity of the airstream increases, the solid deposits, such as, but not limiting of, salts, may absorb moisture from and liquefy, as an acid or base, and cause corrosion on the parts of the compressor 205.

Generally, if the operating environment of the turbomachine 200 is acidic in nature, then the deposits on the compressor 205 may be acidic in nature. These acidic corrosives may include for example, but not limiting of, sulfur oxides or chloride. The inlet filter house 110 may not completely mitigate the effect of these acidic compounds on the compressor 205. An embodiment of the present invention may mix at least one chemical agent with a cleaning fluid, creating a cleaning solution that may reduce the level of corrosive deposits on the compressor 205. Here the clean solution may be considered mildly basic. The cleaning solution may react with the acidic deposits on the compressor 205; neutralizing, and possibly mitigating the corrosion.

In this embodiment, the pH range of the cleaning solution may be from about 7 to about 14. The at least one chemical agent may comprise at least of: sodium hydroxide; caustic soda; calcium hydroxide; ammonium hydroxide; ammonia water; magnesium hydroxide; a bleach; or combinations thereof.

Similarly, if the operating environment of the turbomachine 200 is caustic in nature, then the deposits on the compressor 205 may be caustic in nature. The inlet filter house 110 may not completely mitigate the effect of these caustic compounds on the compressor 205. An embodiment of the present invention may mix at least one chemical agent with a cleaning fluid, creating a cleaning solution for reducing the amount of corrosive deposits on the compressor 205. Here the clean solution may be considered mildly acidic. The cleaning solution may react with the basic deposits on the compressor 205, neutralizing; and possibly mitigating the corrosion.

In this embodiment, the pH range of the cleaning solution may be from about 1 to about 7. The at least one chemical agent may comprise at least of: hydrochloric acid; sulfuric acid; nitric acid; carbonic acid; uric acid; ascorbic acid; citric acid; acetic acid; tannic acid; tartaric acid; or combinations thereof.

Generally, the water wash system 215 in accordance with embodiments of the present invention may operate as follows. An operator may initiate the on-line water wash system 215. Then a rinse cycle commences; which may only use at least one cleaning fluid from the first tank 230. Next, a wash cycle commences; which may include at least one cleaning solution comprising at least one cleaning fluid and at least one cleaning agent. Next, a second and/or final rinse may commence to rinse away some of the corrosives and the cleaning solution from the compressor 205.

An operator using this first exemplary embodiment of the present invention may have determined that corrosive deposits have fouled the compressor 205. The operator may configure the water wash system 215 to allow for a predetermined amount of the at least one chemical agent in the second tank 235 to enter the first tank 230 via the direct line 240. The operator may utilize a mixer or the like (not illustrated in FIG. 2) to mix the at least one chemical agent with the de-min water, or other cleaning fluid, within the first tank 230; creating the cleaning solution. Next the pump 250 may be operated to move the cleaning solution downstream of the first tank 230 through the header 255, which may be connected to the manifold (s) 220. A first manifold 220 may be located adjacent a forward portion of the inlet plenum 145, and a second manifold 220 may located adjacent an aft end of the inlet plenum 145. Each manifold 220 may have a series of flexible metal piping that connects each manifold 220 to a set of spray nozzles 225. The pump 250 may then drive the cleaning solution through the spray nozzles 225 where the cleaning of the compressor 205 commences. The duration that the water wash system 215 operates generally depends on the nature and severity of the corrosion on the components of the compressor 205.

A second exemplary embodiment of the present invention incorporates a bypass line 245; which may prevent the contents of the second tank 235 from directly entering the first tank 230. Here, the contents of the first and second tanks 230, 235 may mix in the header 255. This embodiment may be beneficial to an operator who does not want residue from the at least one chemical agent to remain within the first tank 230.

An operator using this second embodiment of the present invention may have determined that corrosive deposits foul the compressor 205. The operator may configure the water wash system 215 to allow for a predetermined amount of the at least one chemical agent in the second tank 235 to enter the header 255 via the bypass line 245. The operator may utilize a mixer, vibration means, or the like (not illustrated in FIG. 2) to mix the at least one chemical agent with the cleaning fluid of the first tank 230, creating the cleaning solution. Next, the pump 250 may be operated to move the cleaning solution to the manifold (s) 220. The pump 250 may then drive the cleaning solution through the spray nozzles 225 where the cleaning of the compressor 205 commences. The duration that the water wash system 215 operates generally depends on the nature and severity of the corrosion on the components of the compressor 205.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A method of reducing corrosives on a compressor of a turbomachine, the method comprising:
    providing a turbomachine comprising an inlet system for directing air into a compressor of the turbomachine, the inlet system comprising:
    an inlet filter house for screening an airstream entering the inlet system;
    a cooling module for conditioning the airstream within the inlet system;
    a silencer section for reducing noise within the inlet system;
        an inlet bleed heat system for conditioning the airstream; and
        an inlet plenum; and
    providing an online water-wash system with components permanently connected to the turbomachine; wherein components of the online water-wash system are not removed when the online water-wash system is not in operation; and wherein components of the online water-wash system comprise:
        a plurality of nozzles positioned within the inlet plenum;
        a first tank for storing at least one cleaning fluid used by the water-wash system; and
        a second tank for storing at least one chemical agent used by the water-wash system;
    operating the online water-wash system as the turbomachine operates at a synchronous speed;
    mixing the at least one chemical agent with the cleaning fluid to create a cleaning solution; and
    moving the cleaning solution through the plurality of nozzles towards the compressor; wherein the cleaning solution engages components of the compressor in a manner that reduces corrosives on the compressor, wherein the step of moving the cleaning solution through the plurality of nozzles towards the compressor comprises using at least one pumping system, wherein the at least one pumping system drives the at least one cleaning solution through the plurality of nozzles towards the components of the compressor; and the method further comprises the step of mixing, within a header, the at least one chemical agent and the cleaning fluid, wherein the second tank and the first tank are each separately connected to the header.

2. The method of claim 1, further comprising the step of neutralizing acidic corrosives on the compressor by creating the cleaning solution with a pH range of from about 7 to about 14.

3. The method of claim 2, wherein the at least one chemical agent of the cleaning solution comprises at least one of: sodium hydroxide; caustic soda; calcium hydroxide; ammonium hydroxide; ammonia water; magnesium hydroxide; a bleach; or combinations thereof.

4. The method of claim 1, further comprising the step of neutralizing basic corrosives on the compressor by creating the cleaning solution with a pH range of from about 1 to about 7.

5. The method of claim 4, wherein the at least one chemical agent of the cleaning solution comprises at least one of: hydrochloric acid; sulfuric acid; nitric acid; carbonic acid; uric acid; ascorbic acid; citric acid; acetic acid; tannic acid; tartaric acid; or combinations thereof.

6. The method of claim 1, further comprising the step of mixing, within the second tank, the at least one chemical agent and the cleaning fluid, wherein the second tank is connected to the first tank.

7. The method of claim 1, wherein the cleaning fluid within the first tank comprises de-mineralized water.

8. A method of reducing corrosives on a compressor of a turbomachine, the method comprising:
    providing a turbomachine comprising an inlet system for directing air into a compressor of the turbomachine, the inlet system comprising:
    an inlet filter house for screening an airstream entering the inlet system;
    a cooling module for conditioning the airstream within the inlet system;
    a silencer section for reducing noise within the inlet system;
        an inlet bleed heat system for conditioning the airstream; and
        an inlet plenum; and
    providing an online water-wash system with components permanently connected to the turbomachine; wherein components of the online water-wash system are not removed when the online water-wash system is not in operation; and wherein components of the online water-wash system comprise:
        a plurality of nozzles positioned within the inlet plenum;
        a first tank for storing at least one cleaning fluid used by the water-wash system; and
        a second tank for storing at least one chemical agent used by the water-wash system;

operating the online water-wash system as the turbomachine operates at a synchronous speed;

mixing the at least one chemical agent with the cleaning fluid to create a cleaning solution; and moving the cleaning solution through the plurality of nozzles towards the compressor; wherein the cleaning solution engages components of the compressor in a manner that reduces corrosives on the compressor, wherein the step of moving the cleaning solution through the plurality of nozzles towards the compressor comprises using at least one pumping system, wherein the at least one pumping system drives the at least one cleaning solution through the plurality of nozzles towards the components of the compressor; and the method further comprises the step of mixing, within a header, the at least one chemical agent and the cleaning fluid, wherein the second tank and the first tank are each separately connected to the header;

further comprising the step of mixing, within the second tank, the at least one chemical agent and the cleaning fluid, wherein the second tank is connected to the first tank.

\* \* \* \* \*